(12) United States Patent
Sato et al.

(10) Patent No.: US 9,116,525 B2
(45) Date of Patent: Aug. 25, 2015

(54) REFERENCE ANGLE DETECTING DEVICE

(75) Inventors: Eiji Sato, Kobe (JP); Satoaki Ichi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 280 days.

(21) Appl. No.: 13/976,436

(22) PCT Filed: Nov. 29, 2011

(86) PCT No.: PCT/JP2011/006622
§ 371 (c)(1),
(2), (4) Date: Jul. 17, 2013

(87) PCT Pub. No.: WO2012/090391
PCT Pub. Date: Jul. 5, 2012

(65) Prior Publication Data
US 2013/0285590 A1   Oct. 31, 2013

(30) Foreign Application Priority Data

Dec. 27, 2010 (JP) .................................. 2010-290475

(51) Int. Cl.
*G05G 5/00* (2006.01)
*G05D 3/12* (2006.01)
(Continued)

(52) U.S. Cl.
CPC ............. *G05D 3/125* (2013.01); *F01L 13/0026* (2013.01); *F01L 13/0063* (2013.01); *F01L 1/08* (2013.01); *F01L 1/143* (2013.01); *F01L 13/0005* (2013.01); *F01L 2001/0476* (2013.01); *F01L 2001/0537* (2013.01); *F01L 2001/34433* (2013.01); *F01L 2103/00* (2013.01);
(Continued)

(58) Field of Classification Search
USPC .......... 318/626, 560; 123/185.11; 477/16, 80, 477/75, 84
See application file for complete search history.

(56) References Cited

U.S. PATENT DOCUMENTS 5,835,877 A * 11/1998 Unuvar et al. ................. 701/93
7,550,894 B2 * 6/2009 Hino et al. .................... 310/268
(Continued)

FOREIGN PATENT DOCUMENTS

JP   2009036034   *   2/2009
JP   2009036034 A     2/2009
JP   2009209711 A     9/2009

OTHER PUBLICATIONS

Japanese Patent Office, International Search Report of PCT/JP2011/006622, Feb. 21, 2012, WIPO, 1 page.

*Primary Examiner* — Rita Leykin
(74) *Attorney, Agent, or Firm* — Alleman Hall McCoy Russell & Tuttle LLP

(57) ABSTRACT

A reference angle detecting device includes a control shaft connected to a controlled object, an electric motor causing the control shaft to rotate via a worm gear mechanism, a stopper disposed on a motion track of a worm wheel, an angle sensor that can detect a rotation angle of the control shaft, and a controller. The stopper includes a spring member which is elastically deformable in an operation direction of the worm wheel. The controller drives the electric motor to operate so that the worm wheel may face the stopper, and stores the rotation angle at a time point when a change rate $\omega$ of the rotation angle $\theta$ detected by the angle sensor changes to a value less than a predetermined threshold $\omega 1$ as a reference angle $\theta_0$. Therefore, the reference angle can be detected with high accuracy for control of an angle of the control shaft.

6 Claims, 13 Drawing Sheets

(51) Int. Cl.
- *F01L 1/08* (2006.01)
- *F01L 13/00* (2006.01)
- *F01L 1/047* (2006.01)
- *F01L 1/053* (2006.01)
- *F01L 1/344* (2006.01)
- *F02B 61/02* (2006.01)
- *F01L 1/14* (2006.01)

(52) U.S. Cl.
CPC .......... *F01L2250/02* (2013.01); *F01L 2800/00* (2013.01); *F01L 2800/14* (2013.01); *F01L 2820/032* (2013.01); *F01L 2820/041* (2013.01); *F01L 2820/042* (2013.01); *F01L 2820/045* (2013.01); *F02B 61/02* (2013.01)

(56) References Cited

U.S. PATENT DOCUMENTS

| | | | |
|---|---|---|---|
| 7,906,884 B2* | 3/2011 | Hino et al. | 310/191 |
| 7,938,100 B2* | 5/2011 | Takahashi et al. | 123/346 |
| 8,096,272 B2* | 1/2012 | Takahashi et al. | 123/90.16 |
| 8,316,981 B2* | 11/2012 | Nyberg et al. | 180/249 |
| 8,371,987 B2* | 2/2013 | Tsukada et al. | 477/99 |

* cited by examiner

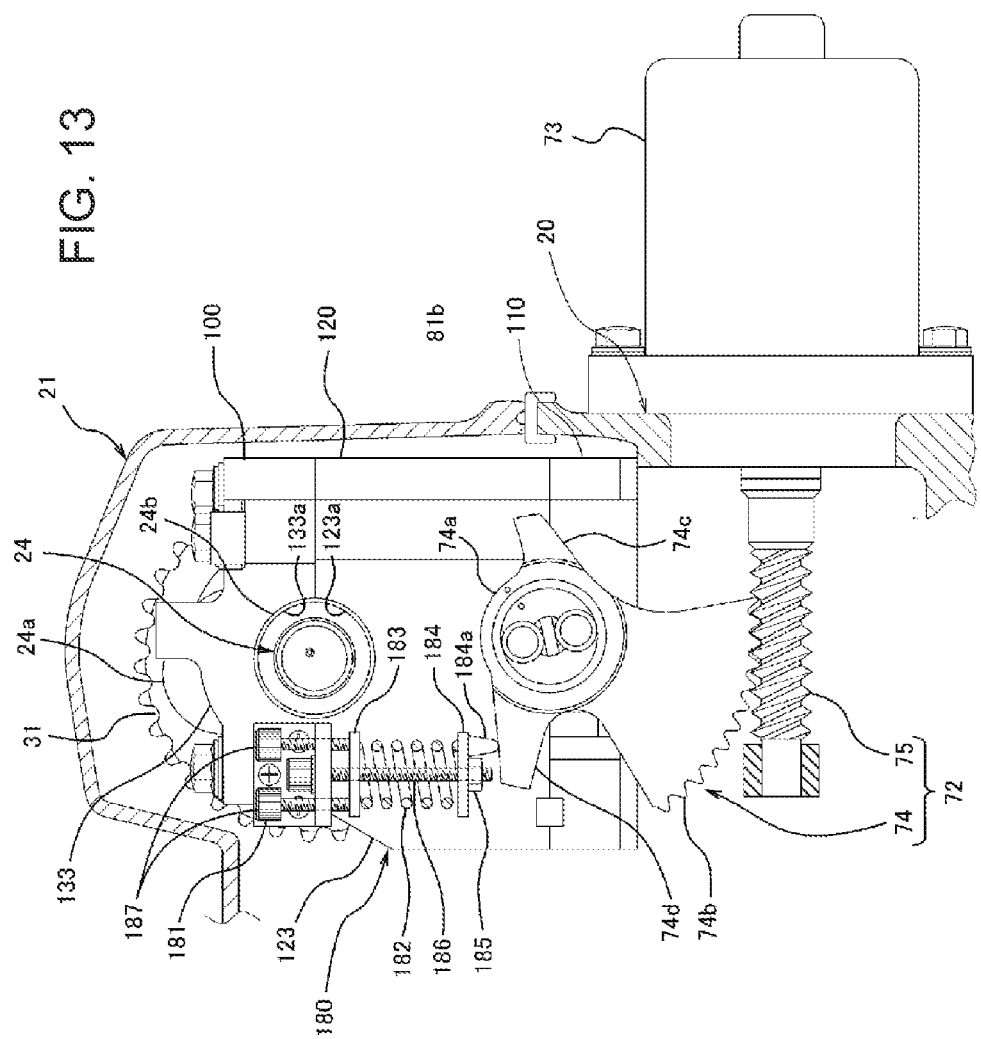

REFERENCE ANGLE DETECTING DEVICE

TECHNICAL FIELD

The present invention relates to a detecting device for detecting a reference angle used as a reference at the time of controlling an angle of a controlled object.

BACKGROUND ART

From the past, in a valve gear configured to drive, for example, an intake valve and an exhaust valve of an engine with a cam shaft, there is a known variable valve actuation mechanism that can change lift characteristics of the valves. As an example, the variable valve actuation mechanism disclosed in Patent Document 1 includes a driven member which is operated by a driving cam of a cam shaft, a pivot member which pivots in association with operation of the driven member to open and close an intake valve, and a mechanism which changes a relative positional relationship between both of the members in association with rotation of a control shaft.

An electric motor is connected to the control shaft via a worm gear mechanism. When the control shaft is rotated by the electric motor, the relative positional relationship between the driven member and the pivot member is changed, resulting in a change in a pivoting range of the pivot member. In this manner, a lift amount and a lift timing of an intake valve are changed. The electric motor operates in response to instructions from a controller, and a rotation angle of the control shaft which pivots in association with the operation of the electric motor is detected by an angle sensor and is fed back to the controller.

In order to restrict the rotation angle of the control shaft to fall within a predetermined range, a stopper is disposed on an operation track of a worm wheel fixed to the control shaft. In regard to the stopper, an elastic body such as rubber is interposed between a cylindrical contact member and a shaft member which supports the contact member, and the contact member is displaced according to deformation of the elastic body when the worm wheel comes into contact with the stopper. This loosens the engagement between threads and teeth in the worm gear and, also after that, the worm gear mechanism comes to operate smoothly.

PRIOR ART DOCUMENT

Patent Document

Patent Document 1: Japanese Laid-Open Patent Application Publication No. 2009-209711

SUMMARY OF THE INVENTION

Problems to be Solved by the Invention

However, in the conventional variable valve actuation mechanism, since the lift characteristics of the intake and exhaust valves of the engine are determined according to the angle of the control shaft, control accuracy of the control shaft is significantly important. Therefore, in order to accurately detect a state serving as a reference for angle control of the control shaft, a method of determining an angle when the worm wheel comes into contact with the stopper to be a reference angle is proposed.

However, since the stopper of the conventional art uses an elastic body, such as rubber, when the worm wheel comes into contact with the stopper, a contact portion will be displaced, and an angle to serve as a reference will be changed. That is, since a contact state of the worm wheel and the stopper is not stabilized, it is difficult to avoid an increase in a detection error of the reference angle.

In view of the circumstances, an object of the present invention is to provide a reference angle detecting device that can detect a reference angle with high accuracy during control of an angle of a control shaft, while loosening engagement in a worm gear similar to those used previously.

Solutions to the Problems

A reference angle detecting device according to the present invention includes a control shaft connected to a controlled object in order to control an angle of the controlled object, a worm wheel connected to the control shaft so as to cause the control shaft to rotate about the axial center thereof, a worm gear that meshes with the worm wheel, an electric motor for rotating the worm gear, a controller that controls the electric motor, a stopper disposed on a motion track of the worm wheel in order to restrict a rotatable range of the control shaft, and an angle sensor capable of detecting a rotation angle of the control shaft.

In addition, the stopper includes a spring member that is elastically deformable in an operation direction of the worm wheel. The controller drives the electric motor to operate so that the worm wheel may face the stopper, and stores as a reference angle a rotation angle at a time point when a change rate of the rotation angle detected by the angle sensor during drive of the electric motor changes from a value equal to or higher than the predetermined threshold to a value less than a predetermined threshold.

In this configuration, the electric motor is driven by the controller and the angle of the controlled object is controlled according to rotation of the control shaft which is rotated via a worm gear mechanism. And when detecting the angle of the control shaft used as the reference for the control, the controller drives the electric motor to operate so that the worm wheel may face the stopper, and monitors the rotation angle of the control shaft detected by the angle sensor during the drive and the change rate of the rotation angle of the control shaft. Since the rotation speed is lowered compared with just before when the worm wheel comes into contact with the stopper, if the rotation angle at the time that the change rate of the rotation angle detected by an angle sensor becomes less than a threshold is stored as the reference angle, the rotation angle of the control shaft when the worm wheel comes into contact with the stopper is detectable as the reference angle.

Furthermore, even though the electric motor undergoes overspeed rotation due to failure of a control system and the worm wheel collides with the stopper, since the shock attributable to the collision is absorbed by the spring member, engagement of threads and teeth in the worm gear mechanism is loosened, and, also after that, smooth operation of the worm gear mechanism is guaranteed. That is, this configuration enables detection of the reference angle of the control shaft with high accuracy, preventing generation of a malfunction related to the engagement in the worm gear mechanism.

Preferably the stopper may include a contact portion that comes into contact with the worm wheel and is movable in the operation direction, and a restricting portion that restricts movement of the contact portion toward the worm wheel in a state in which the contact portion is biased toward the worm wheel by the spring member beforehand. By adopting this configuration, at the moment that the worm wheel comes into contact with the contact portion of the stopper, a biasing force of the spring member restrained by the restricting portion until then is applied to the worm wheel at once, and comes to strongly resist the movement. Therefore, the contact with the stopper remarkably reduces the rotation speed of the worm wheel, and improves the accuracy of a threshold determination about the change rate of the rotation angle.

In other words, even though a spring constant of the spring member is not excessively high, the rotation speed of the worm wheel can be reliably lowered, and the reference angle can be detected with high accuracy based on this. Therefore, it becomes easy to absorb the shock, which occurs when the worm wheel collides with the stopper during the overspeed operation of the electric motor, by the spring member. And, this is advantageous in terms of loosening the tooth engagement in the worm gear mechanism.

In this case, it is preferable to provide an adjusting mechanism that enables adjustment of a position where movement of the contact portion is restricted by the restricting portion, in the stopper. With this configuration, the position of the contact portion of the stopper which decides the reference angle of the control shaft can be easily adjusted.

Furthermore, it is preferable that the controller has a normal control mode in which the electric motor is driven to operate in order to control the angle of the controlled object; and a reference angle detection mode in which the electric motor is driven to operate in order to detect the reference angle, and the driving power of the electric motor in the reference angle detection mode is set to be smaller than the driving power of the electric motor in the normal control mode.

With this configuration, the driving power of the electric motor when the reference angle is detected is reduced. Accordingly, the rotation speed of the control shaft is remarkably lowered when the worm wheel comes into contact with the stopper. Therefore, the accuracy of the threshold determination of the change rate of the rotation angle of the control shaft can be further improved.

The reference angle detecting device of this configuration is desirably used for a variable valve actuation mechanism of an engine disclosed in the conventional art (Patent document 1) described above as an example. In this case, a lift characteristic of an intake valve or an exhaust valve of the engine is changed according to the rotation angle of the control shaft. However, when a valve lift is small, for example, especially at the time of idling, a very high accurate control is required to maintain combustion stability (idling stability) of the engine. Therefore, the fact that an angle which serves as the reference of the control of the control shaft can be detected with high accuracy as in the present invention is significantly meaningful.

In this case, it is preferred to detect the reference angle in a state in which the engine is operating. In the state in which the engine is operating, oil circulates through each portion of the valve operating system and mechanical frictional resistance is small compared with a stopped state. Therefore, a rotation state of the control shaft is also easily stabilized and the reference angle can be stably detected.

Effects of the Invention

According to the reference angle detecting device according to the present invention as described above, the spring member is provided in the stopper so as to absorb the shock attributable to the collision of the worm wheel during the overspeed operation, and the generation of the malfunction related to the engagement in the worm gear mechanism can be prevented. On the other hand, when detecting the reference angle for the rotation control of the control shaft, because of the fact that the rotation speed is lowered as the worm wheel comes into contact with the stopper and the change rate of the rotation angle falls to a value less than the predetermined threshold, a highly accurate detection can be performed.

BRIEF DESCRIPTION OF THE DRAWINGS

FIG. 13 is a diagram corresponding to FIG. 7, according to another embodiment in which a preload of the stopper can be adjusted.

EMBODIMENTS OF THE INVENTION

Figure 1:
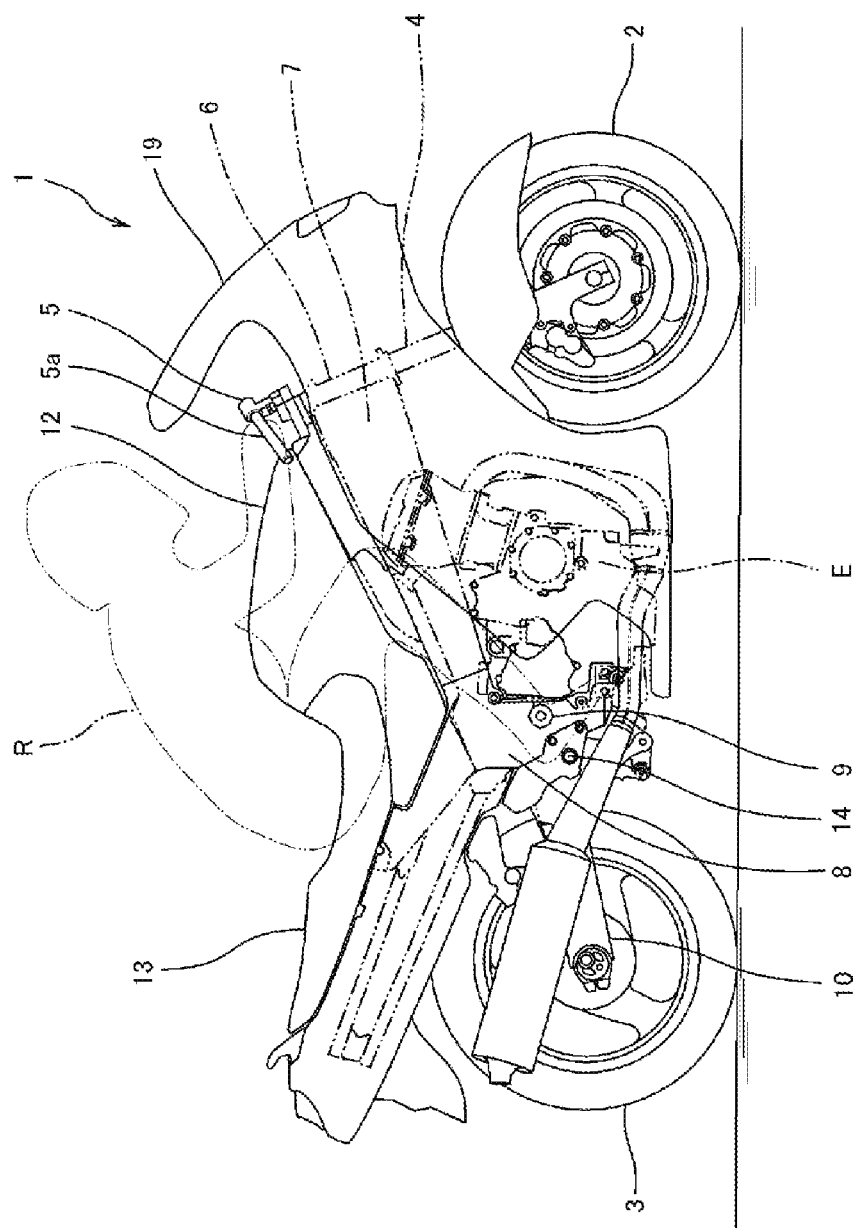
FIG. 1 is a right side view of a motorcycle to which an engine according to the present invention is mounted.

Hereinafter, embodiments in which a reference angle detecting device according to the present invention is applied to a drive mechanism of a variable valve actuation system of an engine are described with reference to the drawings. FIG. 1 is a right side view of a motorcycle 1 to which an engine E according to an embodiment is mounted. In the concept of directions in the following embodiments, directions are referenced from a perspective of a rider R mounting the motorcycle 1.

As illustrated in FIG. 1, the motorcycle 1 includes a front wheel 2 as a steering wheel and a rear wheel 3 as a driving wheel. The front wheel 2 is rotatably supported by lower ends of a pair of left and right front forks 4, each of which substantially vertically extends. On the other hand, upper portions of the front forks 4 are supported by a steering shaft (not illustrated) via a pair of brackets, an upper bracket and a lower bracket. A bar-like handle 5 which extends rightward and leftward is attached to the upper bracket, and a steering shaft is supported so as to be rotatable in a state where it is inserted in a head pipe 6 of a body.

In addition, left and right ends of the handle 5 are provided with grips (a right-side is provided with an accelerator grip 5a), respectively. A rider R grips these grips to manipulate the handle 5. That is, the rider R can turn the front wheel 2 toward a desired direction by collectively turning the pair of front forks 4 and the front wheel 2 about the steering shaft. Furthermore, the rider R can adjust the output of the engine E by rotating the accelerator grip 5a gripped by the right hand by a twist of the rider's wrist.

A pair of left and right mainframes 7 which form a frame of the body extend rearward from the head pipe 6, and pivot frames 8 extend downward from rear portions of the mainframes 7, respectively. A front end portion of a swing arm 10 is pivotally supported on pivots 9 provided in the pivot frames 8, and the rear wheel 3 is rotatably supported by a rear end portion of the swing arm 10.

A fuel tank 12 is provided above the mainframes 7, and a rider's seat 13 is provided in the rear of the mainframes 7. The engine E is mounted in a lower position of a gap between the left and right mainframes 7. The output of the engine E is transmitted to the rear wheel 3 via a drive chain (not illustrated). In the example of the figure, a cowling 19 is provided to extend over a range from the top of the front wheel 2 to the side of the engine E. The rider R drives the motorcycle while sitting on the seat 13, holding the left and right grips of the handle 5, and putting the rider's feet on steps 14 provided around the rear of the engine E.

—Engine—

Figure 2:
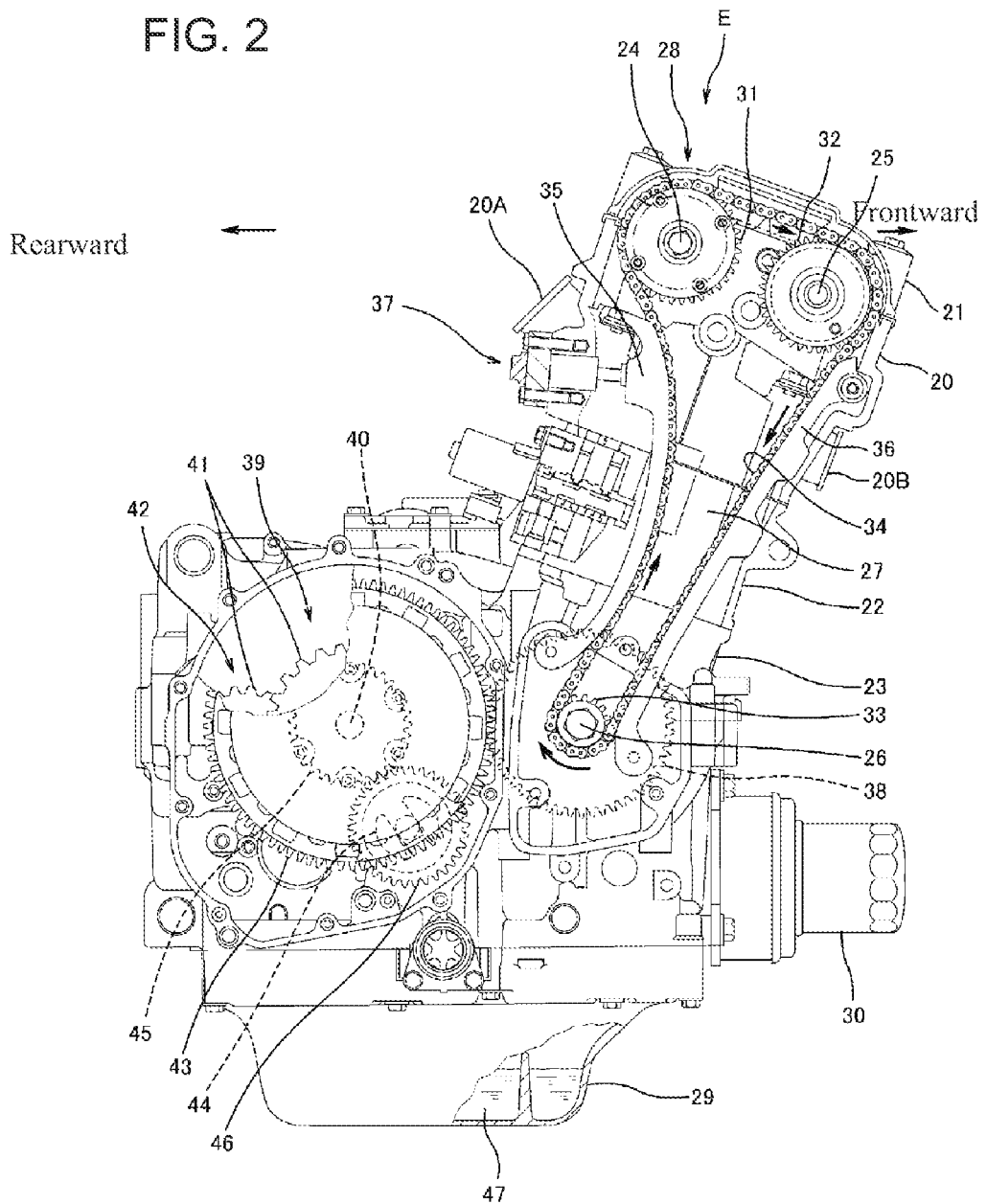
FIG. 2 is an enlarged right side view illustrating the engine, which is partially sectioned.

FIG. 2 is an enlarged right side view illustrating the engine E of FIG. 1 which is partially sectioned. For example, the engine E is a parallel 2-cylinder engine including a cylinder head 20, a cylinder head cover 21, a cylinder block 22, and a crankcase 23 as illustrated in FIG. 2. In the rear of the cylinder head 20, an intake port 20A is provided for every cylinder, and is open to face in a rearward and obliquely upward direction. On the other hand, in the front of the cylinder head 20, an exhaust port 20B is provided for every cylinder, and is open to face in a forward direction.

The engine E is a so-called double overhead cam shaft type (DOHC type) engine. As will be described later in detail, in an upper portion of the cylinder head 20, a driving cam shaft 24 of an intake-side valve gear 50A (see FIG. 3) and a driving cam shaft 25 of an exhaust-side valve gear 50B are arranged in a forward and rearward direction of the body, and each of the valve gears 50A and 50B extend over two cylinders in a vehicle width direction. The cylinder head cover 21 is laid to cover the top of these structures and is fixed to the cylinder head 20.

On the other hand, the cylinder block 22 is connected to a lower portion of the cylinder head 20, and two cylinders which accommodate their own pistons (not shown), respectively are formed. The crankcase 23 is connected to a lower portion of the cylinder block 22, and accommodates a crankshaft 26 extending in the vehicle width direction. A chain tunnel 27 is formed inside right wall portions of the cylinder head 20, cylinder head cover 21, cylinder block 22, and crankcase 23, and a chain-type rotation transmission mechanism 28 which transmits rotary power of the crankshaft 26 to the driving cam shafts 24 and 25 is accommodated. An oil pan 29 is installed in a lower portion of the crankcase 23, and an oil filter 30 is disposed in a front portion of the crankcase 23.

The rotation transmission mechanism 28 includes an intake cam sprocket 31, an exhaust cam sprocket 32, a crank sprocket 33, and a timing chain 34. Specifically, end portions on the right side of the intake-side and exhaust-side driving cam shafts 24 and 25 protrude inward inside the chain tunnel 27, and the intake-side and exhaust-side cam sprockets 31 and 32 are provided on these end portions. Similarly, an end portion on the right side of the crankshaft 26 also protrudes inward inside the chain tunnel 27, and the crank sprocket 33 is provided on this end portion.

In addition, the timing chain 34 is wound around the intake cam sprocket 31, the exhaust cam sprocket 32, and the crank sprocket 33. Thus, when the crank sprocket 33 rotates, the intake cam sprocket 31 and the exhaust cam sprocket 32 are driven to rotate in association with rotation of the crank sprocket 33. The diameter of the intake cam sprocket 31 and the diameter of the exhaust cam sprocket 32 are equal to each other and are two times the diameter of the crank sprocket 33. Therefore, the driving cam shafts 24 and 25 rotate within a half period of the crankshaft 26.

In addition, a movable chain guide 35 and a fixed chain guide 36 are provided in the chain tunnel 27. The fixed chain guide 36 is installed to vertically extend in front of the timing chain 34, and thus extends from a position near the front of the crank sprocket 33 to a position near the bottom of the exhaust cam sprocket 32. This fixed chain guide 36 supports the front side of the timing chain 34 with a groove (not shown) which is formed in a rear portion of the fixed chain guide 36 in a longitudinal direction.

The movable chain guide 35 vertically extends in the rear of the timing chain 34. A lower end portion of the movable chain guide 35 is pivotably supported on a right wall portion of the crankcase 23, in a position near the top of the crank sprocket 33, and an upper end portion of the movable chain guide 35 is located near the bottom of the intake cam sprocket 31. An upper portion of the movable chain guide 35 is biased forward by a hydraulic tensioner 37 provided in a rear wall portion of the cylinder head 20, and the movable chain guide 35 gives adequate tension to the timing chain 34 by supporting the rear side of the timing chain 34.

In addition, a driving gear 38 is provided in a right portion of the crankshaft 26, and meshes with a driven gear 43 which is provided in an input shaft 40 of a transmission 42. That is, a rear portion of the crankcase 23 is a transmission chamber 39, and the input shaft 40 and the output shaft (not shown) are accommodated in the transmission chamber 39 so as to be almost in parallel with the crankshaft 26 of the transmission 42. A plurality of gears 41, which can connect to each other, are installed in both of the shafts. Thus, a speed change ratio between input and output rotations, i.e., a gear position of the transmission 42 changes with a change of the combination of the gears connected to each other.

In addition, the engine E is equipped with an oil pump 44 of a trochoid rotor type in the example of the figures. The oil pump 44 includes a pump driven gear 46 which meshes with a pump driving gear 45 provided in the input shaft 40 of the transmission 42, and the oil pump 44 is driven in association with the rotation of the crankshaft 26.

—Valve Operating System—

Figure 3:
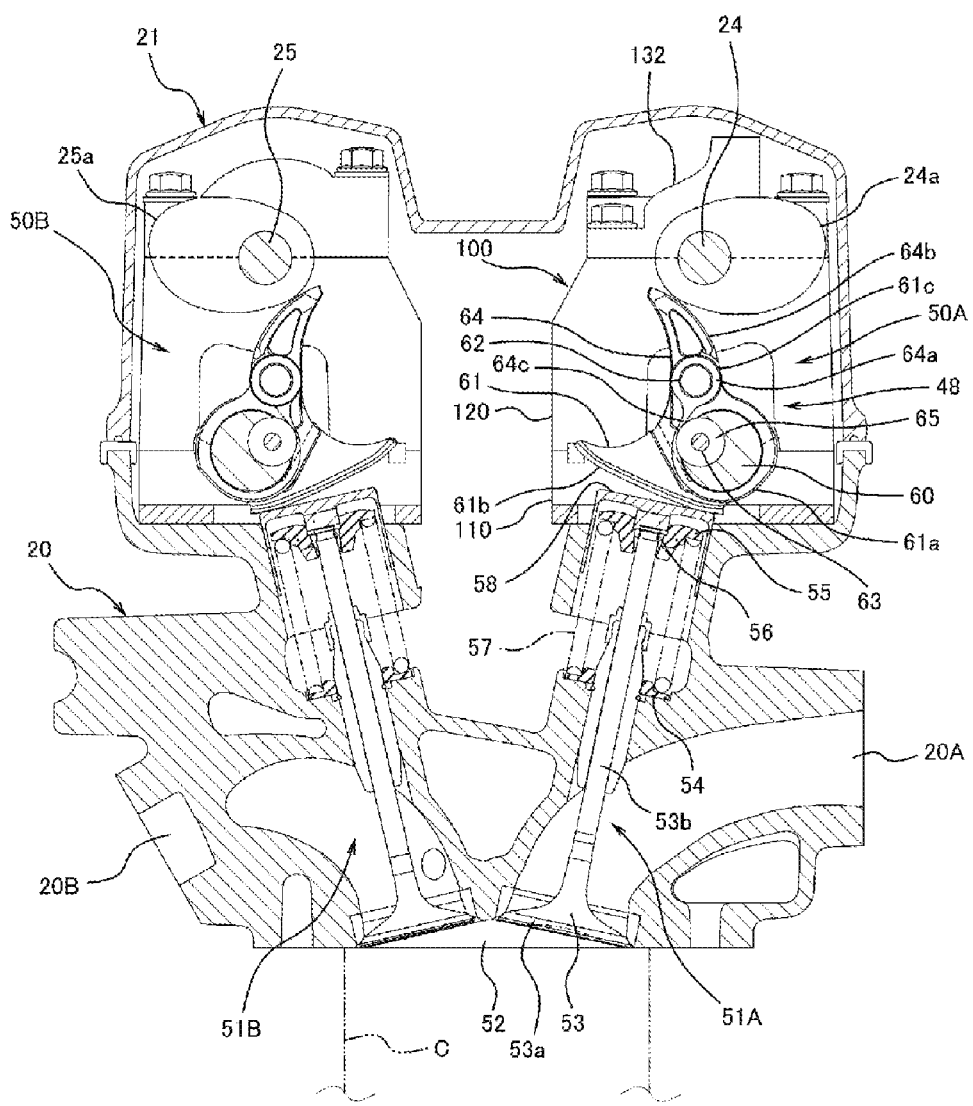
FIG. 3 is an enlarged cross-sectional view illustrating a valve operating system of the engine.
Figure 4:
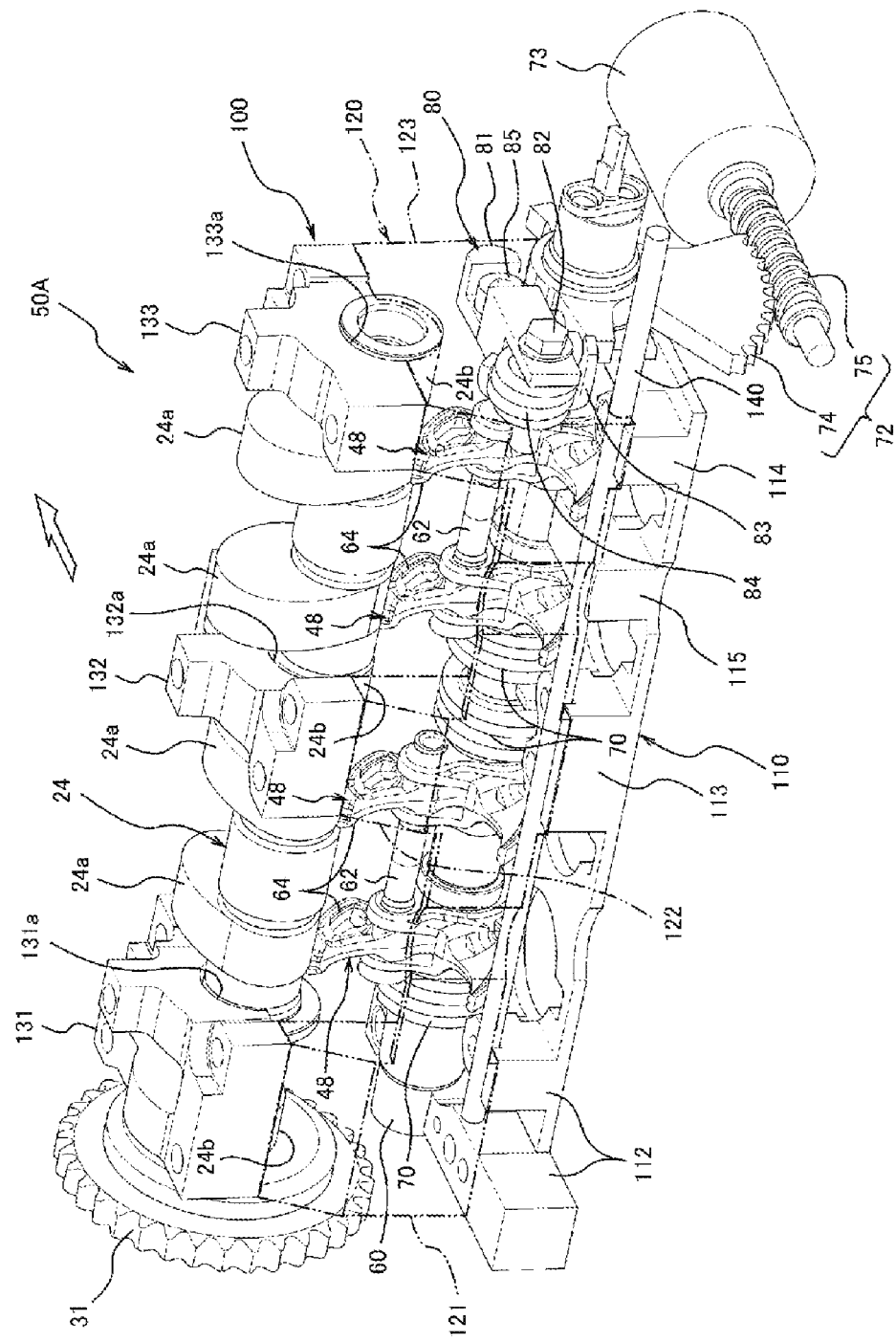
FIG. 4 is a perspective view illustrating the structure of an intake-side valve gear.

FIG. 3 is a cross-sectional view illustrating the structure of a valve operating system of the engine E, and is opposite to FIG. 2 so that the right side in the figure indicates the rear side of the motorcycle 1. FIG. 4 is a perspective view illustrating the intake-side valve gear 50A from which the case is partially removed, and a diagonal right side in the depth direction of the paper represents the rear side of the motorcycle 1. As illustrated in FIG. 3, the cylinder head 20 includes an intake valve mechanism 51A which opens and closes the intake port 20A connected to a combustion chamber 52 which is disposed inside a cylinder C (indicating the upper side of an imaginary line), an exhaust valve mechanism 51B which similarly opens and closes the exhaust port 20B, and the intake-side and exhaust-side valve gears 50A and 50B that operate the intake and exhaust valve mechanisms 51A and 51B, respectively. Since two cylinders C of the engine E are arranged in the vehicle width direction, the combustion chamber 52 is arranged to extend along the depth direction of paper in FIG. 3.

In the present embodiment, since the structure of the intake-side valve gear 50A and the intake valve mechanism 51A is identical to the structure of the exhaust-side valve gear 50B and the exhaust valve mechanism 51B, only the structure for the intake-side valve gear 50A and the intake valve mechanism 51A will be described below as a representative example. The intake valve mechanism 51A will be described first. A valve body 53, which has a well-known structure and is a poppet valve, includes a flange portion 53a which opens and closes the intake port 20A, and a stem portion 53b which extends upward from the flange portion 53a and passes through an upper wall portion of the cylinder head 20.

An upper half portion of the stem portion 53b extends upward within the installation hole which has a circular cross sectional shape and is formed in the upper wall portion of the cylinder head 20, along the central line of the installation hole, and an upper end portion of the stem portion 53b is located almost at the same height as an upper surface of the upper wall portion of the cylinder head 20. A groove is formed in the upper end portion of the stem portion 53b, a spring retainer 55 is installed to a cotter 56 fitted in the groove, and the spring retainer 55 is located near an upper end of the installation hole. On the other hand, a spring seat 54 is disposed in the bottom of the installation hole, and a valve spring 57 is interposed between the spring seat 54 and the spring retainer 55.

In this example, the valve spring 57 is a compression coil spring, and generates a biasing force between the spring seat 54 and the spring retainer 55. This biases the valve body 53 upward via the spring retainer 55 so that the flange portion 53a is pressed against the periphery (valve seat) of the opening of the intake port which faces the combustion chamber 52. That is, in the intake valve mechanism 51A, the valve body 53 is usually biased upward by the valve spring 57 and the intake port 20A stays closed.

A closed end cylindrical tappet 58 which has an opening in the bottom is installed to the stem portion 53b of the valve body 53 so as to cover the spring retainer 55, the cotter 56 and an upper half of the valve spring 57. A lower bottom surface of an upper end portion of the tappet 58 is disposed to protrude from the upper end of the installation hole, and a pivot member 61 (as will be described later) of the valve gear 50A described later slidingly contacts with an upper surface of the tappet 58. When the tappet 58 is pushed down by the pivot member 61 which is pivoted, the valve body 53 is pushed down (lifted), and the flange portion 53a of the valve body 53 moves away from the valve seat, thereby opening the intake port 20A.

The intake-side valve gear 50A that operates the intake valve mechanism 51A includes the driving cam shaft 24 and a pivot cam mechanism 48. The driving cam shaft 24 operates in association with the rotation of the crankshaft 26 of the engine E as described above. The pivot cam mechanism 48 slidingly contacts with a driving cam 24a of the driving cam shaft 24, and converts motion corresponding to the contour of the driving cam 24a into a pivoting motion, so that the pivot member 61 will push the tappet 58 of the intake valve mechanism 51A as described above.

As illustrated in FIG. 4, the driving cam shaft 24 extends in the vehicle width direction (left-right direction in the figure) to be laid over the two cylinders C (not illustrated in FIG. 4), and three journals 24b disposed at both ends and a center of the driving cam shaft 24 are rotatably supported respectively on standing wall portions 121 to 123 of a case 100 of the valve gear 50A. That is, the present embodiment has a structure, for example, that the intake-side valve gear 50A is unified as a unit, the unit is then removably fastened to the cylinder head 20, and the standing wall portions 121 to 123 are provided in the body member 120 (as illustrated by an imaginary line) of the case 100 of the unit, i.e., at both end portions and an approximately center portion in the longitudinal direction, respectively.

Figure 7:
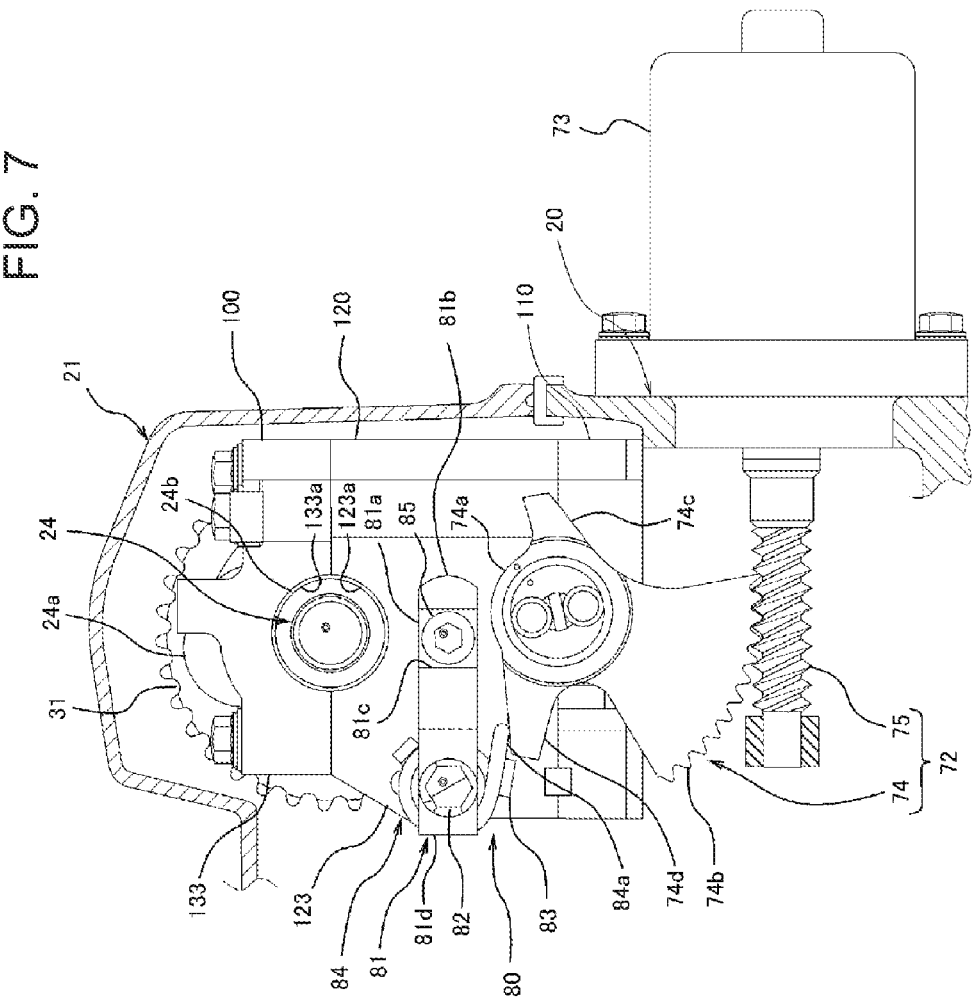
FIG. 7 is an enlarged view of a stopper and a drive mechanism for driving a control shaft.

The right end standing wall portion 123 and a cam cap 133 in FIG. 4 are illustrated in FIG. 7. As can be understood from this illustration, lower bearing recesses (only reference numeral 123a is written) of a semicircular shape which are open in the upper side are formed in upper end portions of the three standing wall portions 121 to 123, respectively, and the lower bearing recesses form, in cooperation with upper bearing recesses 131a to 133a of the cam caps 131 to 133 respectively, the journal bearings that support the journals 24b of the driving cam shaft 24.

For the driving cam shaft 24 that is bearing-supported at the three journals 24b, two driving cams 24a are provided in between every two adjacent journals 24b, that is, a total of four driving cams 24a is provided. And each driving cam 24a operates the pivot cam mechanism 48. That is, in the present embodiment, the intake port 20A for each cylinder C branches on the way in a manner of forming two openings communicating with the combustion chamber 52, and two sets of the intake valve mechanisms 51A are provided for every cylinder C in order to open and close each opening end. And in order to operate each set of the intake valve mechanisms 51A, two sets of the pivot cam mechanisms 48 for every cylinder C, i.e., four pivot cam mechanisms 48 are provided so as to correspond to the four driving cams 24a of the driving cam shaft 24.

—Pivot Cam Mechanism—

More specifically, the four pivot cam mechanisms 48 are supported on the supporting shaft 60 which extends in parallel with the driving cam shaft 24 and is separately disposed under the driving cam shaft 24. Since the supporting shaft 60 rotates about the axial center thereof as described below and is used to control a change in valve lift characteristics, the supporting shaft 60 is referred to as a control shaft 60 hereinafter. As illustrated in FIG. 4, four pivot members 61 are individually and pivotably supported on the control shaft 60, and the tappet 58 of the intake valve mechanism 51A (see FIG. 3) is pushed in association with the pivoting. In addition, a driven member 64 is connected to the pivot member 61 with the connection pin 62. Thus, when the driven member 64 is pushed by the driving cam 24a, the driven member 64 pivots about the control shaft 60 together with the pivot member 61.

Then, the tappet 58 is pushed by the pivot member 61 which pivots about the control shaft 60 together with the driven member 64, so that the valve body 53 of the intake valve mechanism 51A comes to reciprocate. That is, the motion corresponding to the contour of the driving cam 24a is transmitted to the intake valve mechanism 51A by the pivot member 61 and the driven member 64 which pivot about the control shaft 60 together.

Furthermore, in the present embodiment, lost motion in which a portion of the motion of the driving cam 24a is not transmitted to the intake valve mechanism 51A can be achieved by changing a mutual positional relationship between the pivot member 61 and the driven member 64 which pivot together as described above. That is, when the driven member 64 approaches the pivot member 61 in association with rotation of the control shaft 60 as described below, the motion transmitted to the intake valve mechanism 51A from the driving cam 24a decreases accordingly and as a result the lift of the valve body 53 is reduced.

More specifically, the position of the driven member 64 around the connection pin 62 with respect to the pivot member 61, i.e., a nip angle between the driven member and the pivot member continuously changes. That is, as described above, since the pivot member 61 can rotate about the control shaft 60, and the rotation of the driven member 64 which rotates about the connection pin 62 of the pivot member 61 is restricted by the roller 65 embedded in the control shaft 60, if the control shaft 60 is rotated about the axial center thereof and the position of the roller 65 is changed, the mutual positional relationship between the pivot member 61 and the driven member 64 is changed.

A member denoted by reference numeral 140 in FIG. 4 is a round bar-like jig used when adjusting the size of the four pivot cam mechanisms 48 and variation in the valve lift attributable to an assembling error, and the jig is removed after finishing the adjustment. The jig 140 is set in the case 100 of the valve gear 50A in a manner of extending in the direction in which the four pivot cam mechanisms 48 are arranged, i.e., a manner of being in parallel with the driving cam shaft 24 or the control shaft 60, and comes into contact with each of the pivot members 61 of the four pivot cam mechanisms 48, so that a state in which each of the pivot members 61 comes into contact with the tappet 58 is reproduced.

In this example, the case 100 is configured in a manner that it is divided into a floor member 110 placed on top of the cylinder head 20 and a body member 120 combined with an upper portion of the floor member 110, and the three standing wall portions 121 to 123 of the body member 120 and three pedestal portions 112 to 113 of the floor member 110 are joined together, respectively. Therefore, Jig insertion holes for positioning and holding the jig 140 between the standing wall portions 121 to 123 and the pedestal portion 112 to 113 are formed.

Figure 5:
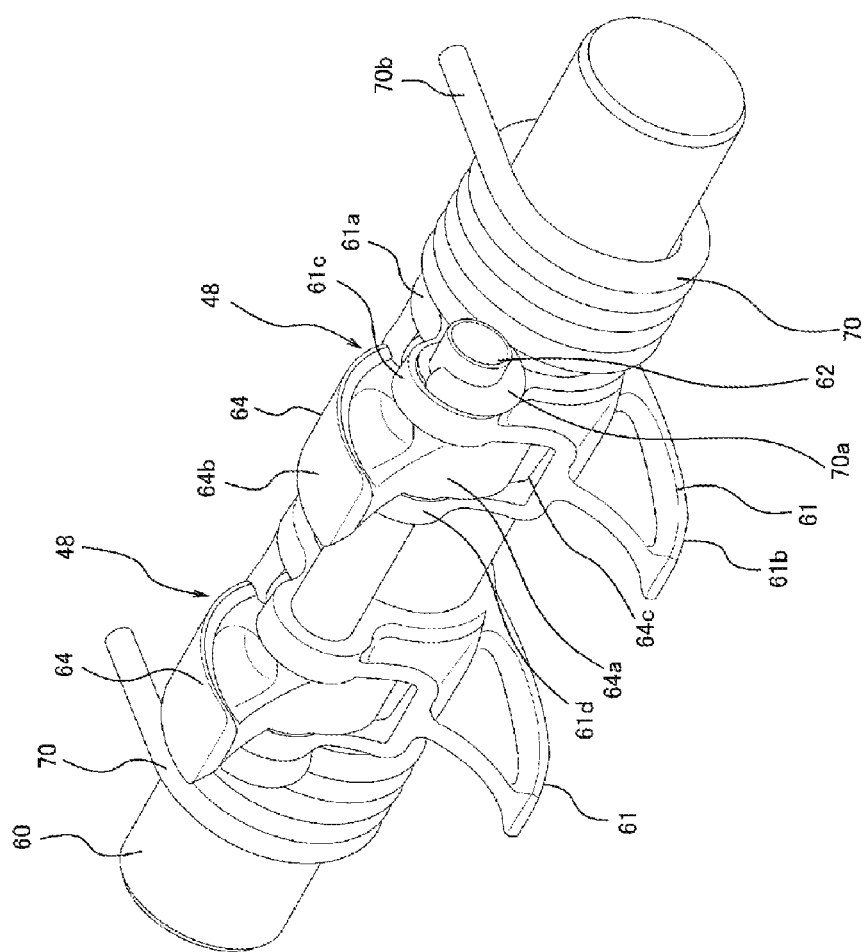
FIG. 5 is a perspective view illustrating a main portion of a pivot cam mechanism of the valve gear.
Figure 6:
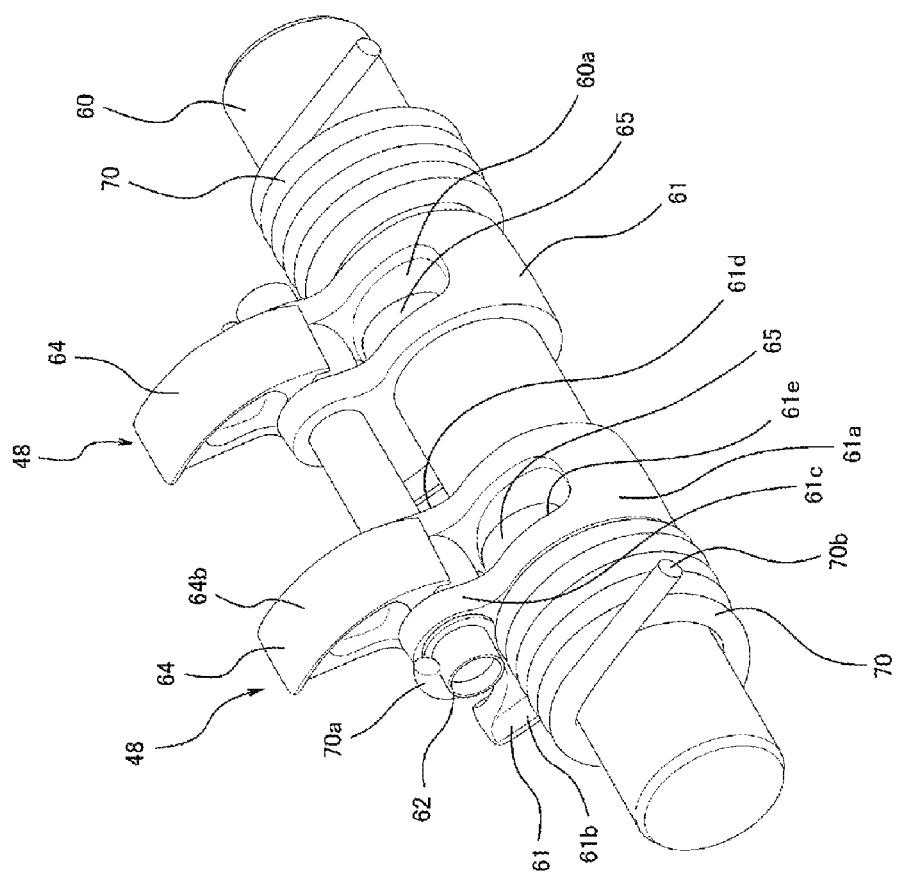
FIG. 6 is a perspective view illustrating the main portion of the pivot cam mechanism viewed from a different angle.

Hereinbelow, the configuration of the pivot cam mechanism 48 will be described in greater detail with reference to FIGS. 5 and 6. FIG. 5 is a perspective view of a main portion of the pivot cam mechanism 48 illustrated in FIGS. 3 and 4, and FIG. 6 is a perspective view illustrating the main portion of the pivot cam mechanism 48 viewed from a different angle.

First, the pivot member 61 includes a ring-shaped portion 61a rotatably and externally fitted to the control shaft 60 and a claw-shaped pivot cam portion 61b which protrudes outward from a lower portion of the ring-shaped portion 61a in a radial direction (sideways in FIG. 5). The pivot cam portion 61b pushes the tappet 58 as the pivot member 61 is pivoted as described above. The pivot cam portion 61b has a substantially circular-sector shape when viewed from an axial center direction of the driving cam shaft 24 as illustrated in FIG. 3, and a lower edge of the pivot cam portion 61b is provided with a sliding surface which slidingly contacts with the upper surface of the tappet 58. An interval between the sliding surface and an axial center of the ring-shaped portion 61a gradually increases toward a leading end of the pivot cam portion 61b from a base portion of the pivot cam portion 61b which is disposed near the ring-shaped portion 61a.

In addition, an oval notch 61e which elongates in a circumferential direction is formed in an upper portion of the ring-shaped portion 61a, and a pair of pin supporting portions 61c and 61d protrude outward in the radial direction of the ring-shaped portion 61a from both sides of the notch 61e like in a manner of facing each other in the axial direction of the ring-shaped portion 61a. The connection pin 62 is inserted through the through-holes of the pin supporting portions 61c and 61d so that the driven member 64 is rotatably supported.

The driven member 64 includes a ring-shaped supporting portion 64a in which the connection pin 62 is inserted, a claw-shaped driven portion 64b which protrudes outward in the radial direction (almost upward direction in FIG. 5) from an upper portion of the supporting portion 64a, and a lever portion 64c which protrudes outward in the radial direction, oppositely, from a lower portion of the supporting portion 64a. While the upper surface (sliding surface) of the driven portion 64b slidingly contacts with an outer circumferential surface of the driving cam 24a, the lever portion 64c is arranged to be loosely-fitted in a notched space of the notch 61e of the pivot member 61, and is in contact with the roller 65 embedded in the control shaft 60.

That is, although not illustrated in the figure, four cavities 60a are respectively formed at four places in the control shaft 60 so as to correspond to the positions in which the four pivot members 61 are disposed, and the roller 65 is accommodated such that the lever portion 64c of the driven member 64 comes into contact with the inside surfaces of the cavities 60a. As illustrated in FIG. 3, the roller 65 is disposed to be shifted from the axial center of the control shaft 60 and eccentrically disposed in the vicinity of the driven member 64, and the roller 65 is rotatably supported by a bar member 63 which passes through the inside of the control shaft 60 in the axial center direction. The roller 65 comes into contact with the lever portion 64c of the driven member 64 as described above, and restricts motion of the driven member 64 which rotates about the connection pin 62.

That is, the driven member 64 is supported by the pivot member 61 so as to be rotatable about the connection pin 62, is in contact with the roller 65 eccentrically embedded in the control shaft 60, and is supported while resisting a force applied from the driving cam 24a. For this reason, if the driven member 64 is pushed to move away from the driving cam 24a, the driven member 64 and the pivot member 61 pivot about the control shaft 60 together.

A torsion coil spring 70 is externally fitted in the control shaft 60. While an end 70a of the torsion coil spring 70 is wound around the connection pin 62, the other end 70b extends toward the opposite side of the end 70a and is locked to a locking portion of the valve gear case 100. The torsion coil spring 70 biases the pivot member 61 via the connection pin 62 so that the pivot member 61 may be rotated about the control shaft 60 toward the driving cam shaft 24, thereby pressing the sliding surface of the driven member 64 against the outer circumferential surface of the driving cam 24a.

In this configuration, if the position of the roller 65 is changed in response to the rotation of the control shaft 60 and the contact position of the roller 65 which comes into contact with the lever portion 64c of the driven member 64 is changed, the position around the control shaft 60, where the rotation of the driven member 64 is restricted by the roller 65, is also changed. However, the pivot member 61 does not depend on the rotation of the control shaft 60 so the position of the pivot member 61 is not changed. For this reason, a nip angle between the driven member 64 and the pivot member 61, which are pushed by the driving cam 24a and pivoted together, is changed.

—Diving Mechanism of Control Shaft—

An electric motor 73 is connected to the control shaft 60 via a worm gear mechanism 72 as illustrated in FIG. 7 as well as FIG. 4 in order to change the relative positional relationship between the driven member 64 and the pivot member 61 in the pivot cam mechanism 48 by rotating the control shaft 60 as described above. As illustrated in a right end of FIG. 4, a sector-shaped worm wheel 74 is installed on the control shaft 60 in a manner of being rotated about the axial center of the control shaft 60, and meshes with a worm gear 75 rotated by the electric motor 73.

That is, in this example, the worm gear 75 is in an approximately cylindrical form, and has an opening at an end (right end in FIG. 7) in an axial direction of the cylinder. The output shaft of the electric motor 73 is inserted in this opening and attached in a spline-mating manner. On the other hand, a small diameter portion having a smaller external diameter compared with the former end is formed at the other end (left end in FIG. 7) in the axial direction of the cylinder of the worm gear 75, and the small diameter portion is fitted into a ring-shaped fitting portion formed in the cylinder head 20 and is rotatably supported.

A spiral thread is formed in an outer circumferential surface of the worm gear 75 and meshes with helical teeth on an outer circumferential surface of the worm wheel 74. When the worm gear 75 is rotated by the electric motor 73, the worm wheel 74 is rotated so that the helical teeth on the outer circumferential surface may move along the spiral thread. On the other hand, even when attempting to rotate the worm wheel 74 with an external force, the worm gear 75 is not rotated and a thrust load acts in the direction of the axial center, but this is received in the fitting portion in which the small diameter portion of the worm gear 75 is fitted, or a casing of the electric motor 73.

As illustrated in FIG. 7 in an enlarged manner, the worm wheel 74 includes a ring-shaped portion 74*a* externally fitted around the control shaft 60 to be fixed, and a gear portion 74*b* provided in a circular-sector form to extend outward in a radial direction within a predetermined angle range of an outer circumferential surface of the ring-shaped portion 74*a*. Arms 74*c* and 74*d* respectively project outward in the radial direction of the ring-shaped portion 74*a* from two positions different from the gear portion 74*b*, the rotation of the worm wheel 74 is permitted within a range that each of the arms 74*c* and 74*d* comes into contact with the stopper 80.

That is, the stopper 80 includes a stopper body member 81 disposed in the standing wall portion 123 of the valve gear case 100 so as to be located on the motion track of the worm wheel 74, a bent piece 83 of an approximately L-shape installed to the stopper body member 81 with a bolt 82, and a torsion coil spring 84 which surrounds a shank of the bolt 82 and is interposed between the stopper body member 81 and the bent piece 83.

The stopper body member 81 includes a rectangle plate-like base portion 81*a* which is overlappingly laid on top of the standing wall portion 123 of the valve gear case 100 and is coupled with a bolt 85, a protrusion 81*b* having a D-shaped cross section which is formed in one end portion (right end portion in FIG. 7) in the longitudinal direction, a protrusion 81*c* having a rectangular cross section which is formed in the other end portion (left end portion in FIG. 7), and a plate-like extension portion 81*d* which extends substantially horizontally so as to be in parallel with the cross section of the base portion and in opposition to the base portion 81*a*. The protrusion 81*b* having the D-shaped cross section is provided with a damper such as rubber although the damper is not illustrated because the arm 74*c* comes into contact with the protrusion 81*b* when the worm wheel 74 rotates in the counterclockwise direction in the figure.

The L-shaped bent piece 83 is disposed to face but to be distanced from the extension portion 81*d*, which substantially horizontally extends, in a direction of the standing wall portion 123, and is combined with the extension portion 81*d*. The shank of the bolt 82 which passes through the extension portion 81*d* is screwed in the nut (not illustrated) fixed to a midway position in the vertical direction. A lower plate portion of the L-shaped bent piece 83 extends up to the bottom of the extension portion 81*d* of the stopper body member 81, comes into contact the outer circumferential surface of the torsion coil spring 84 from the underside, and stays in contact with an end portion of the torsion coil spring 84.

On the other hand, a lock piece which projects in the same direction as the lower plate portion is formed to protrude from an upper portion of the L-shaped bent piece 83, the other end of the torsion coil spring 84 is locked to the lock piece. That is, the torsion coil spring 84 is preliminarily compressed by the bent piece 83 so that both the ends may inwardly come closer to each other. Furthermore, in a more distal position than the contact position where the torsion coil spring is in contact with the lower plate portion of the bent piece 83, an end of the torsion coil spring 84 is bent in an L shape to serve as a contact portion 84*a* which comes into contact with the arm 74*d* when the worm wheel 74 is rotated in the clockwise direction in FIG. 7.

In other words, in regard to the torsion coil spring 84, one end portion, i.e., the contact portion 84*a* is biased downward (toward the worm wheel 74), and the contact portion 84*a* is pressed against the lower plate portion of the bent piece 83 in this downward biased state, so that downward movement is restricted. That is, in the stopper 80 of the present embodiment, the L-shaped bent piece 83 functions as a restricting portion that restricts movement of the contact portion 84*a* of the torsion coil spring 84, which is made toward the worm wheel 74 by the lower plate portion.

And when the arm 74*d* of the worm wheel 74 comes into contact with the contact portion 84*a* from the lower side so as to press upward, the torsion coil spring 84 elastically deforms inward and the contact portion 84*a* moves up. At the moment that the contact portion 84*a* separates from the lower plate portion of the bent piece 83 by this movement, the biasing force of the torsion coil spring 84 restrained by the lower plate portion of the bent piece 83 till then is applied to the arm 74*d* of the worm wheel 74 at once, and comes to strongly resist the upward movement.

When the bolt 85 which fastens the base portion 81*a* of the stopper body member 81 to the valve gear case 100 is loosened, the whole stopper 80 may be rotatable about the shank of the bolt 85. Since the position of the contact portion 84*a* of the torsion coil spring 84 is changed in the vertical direction, the position where the downward movement of the contact portion 84*a* which comes into contact with the arm 74*d* of the worm wheel 74 is restricted by the lower plate portion of the bent piece 83 can be adjusted. That is, an adjusting mechanism which can easily adjust the position may be provided in the stopper 80.

In the driving mechanism of this configuration, the electric motor 73 is driven in response to instructions from a controller 90 (also see FIG. 10) described below. When the worm gear 75 is rotated by this operation and the worm wheel 74 and control shaft 60 are rotated by the operation, as described above, the relative positional relationship between the pivot member 61 and the driven member 64 in the pivot cam mechanism 48 changes, and the pivot range of the pivot member 61 changes by the operation of the driving cam 24*a*. As a result, the lift amount and timing of the valve body 53 in the intake valve mechanism 51A are changed.

Figure 8:
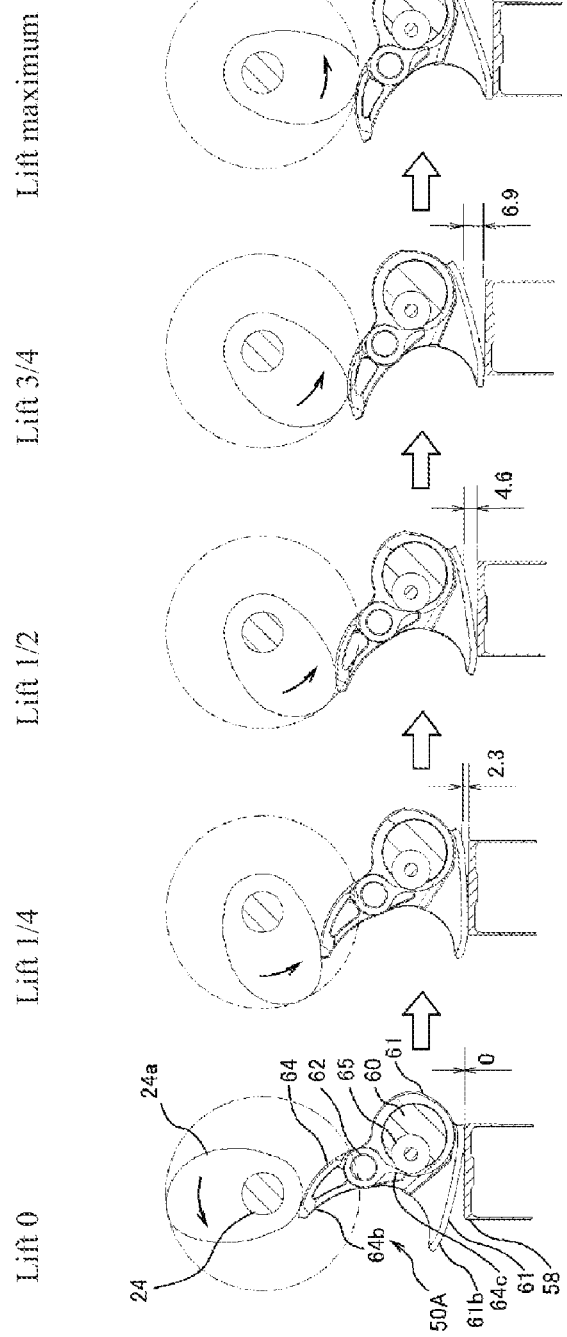
FIG. 8 is a diagram describing operation of the valve gear illustrated in FIG. 3 in normal times.

As an example, operation of the valve gear 50A illustrated in FIG. 3 when in a normal condition is illustrated in FIG. 8. As illustrated in a left end in FIG. 8, at a time point of lift amount zero (lift 0) during which the driven member 64 is in contact with a base circular portion of the driving cam 24*a*, the sliding surface of the base portion in the pivot cam portion 61*b* of the pivot member 61 slidingly contacts with the upper surface of the tappet 58, and thus does not push down the upper surface of the tappet 58. As disposed in the order toward the right side in FIG. 8, as the driving cam 24*a* rotates in a counterclockwise direction in the figure, the driven member 64 is pushed down by the driving cam 24*a*.

Since the driven member 64 is connected to the pivot member 61 via the connection pin 62, and the lever portion 64c thereof is in contact with the roller 65 and supported in a manner resisting the force applied from the driving cam 24a, the rotation of the driven member 64 about the connection pin 62 in a manner approaching the pivot member 61 is restricted. Therefore, while the lever portion 64c of the driven member 64 is sliding around the roller 65, the ring-shaped portion 61a of the pivot member 61 slides on the outer circumference of the control shaft 60. Accordingly, both of them rotate about the control shaft 60 together in the counterclockwise direction in the figure. The tappet 58 is pushed down by the pivot cam portion 61b of the pivot member 61 and, although not illustrated in the figure, the valve body 53 advances (lifts) in a downward direction, thereby opening the intake port 20A.

Figure 9:
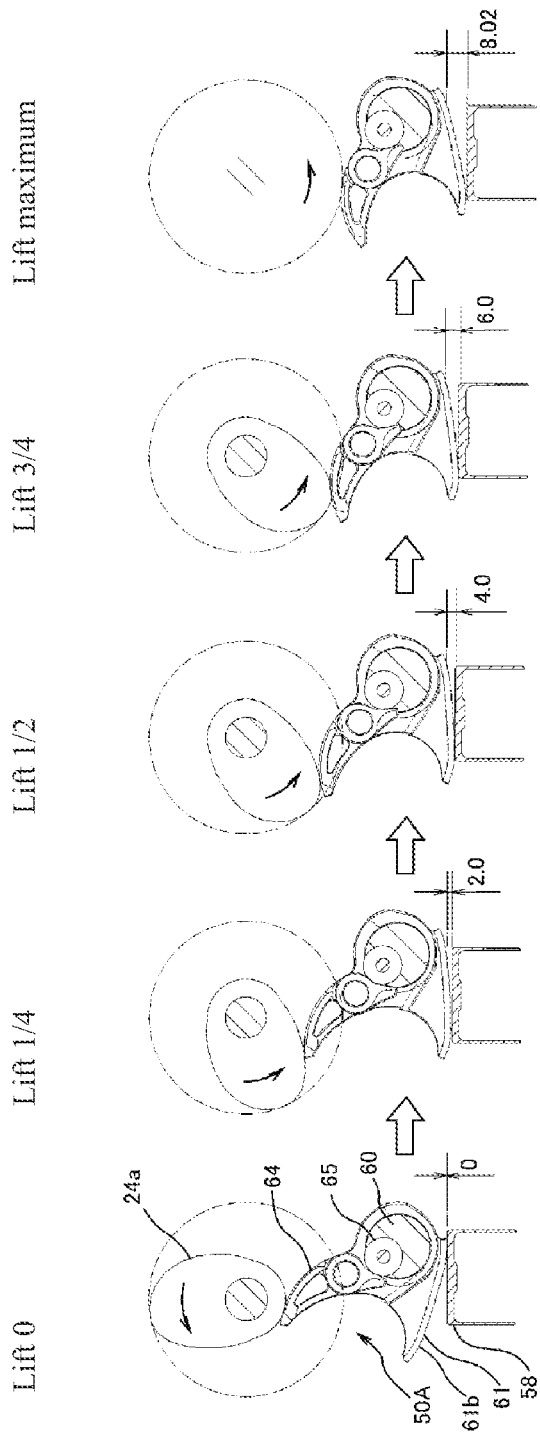
FIG. 9 is a diagram corresponding to FIG. 8 at the time of a slightly low lift.

Next, operation of the valve gear 50A which has changed to have a low lift characteristic compared with the example of FIG. 8 is illustrated in FIG. 9. When the control shaft 60 rotates in a clockwise direction in FIG. 9, the roller 65 relatively moves up in response to this rotation motion, and the contact position of the lever portion 64c of the driven member 64 with respect to the roller 65 changes. In the example of FIG. 9, since the driven member 64 approaches the pivot member 61 in association with such an operation, a portion of the motion is not transmitted from the driving cam 24a and hence the amount of movement of the tappet 58 which is pushed by the pivot member 61 decreases. Therefore, a valve lift is relatively low at the time of the lift maximum as shown in the right end of FIG. 9.

—Drive Control System of Control Shaft—

As described above, the control of rotating the roller 65 of the pivot cam mechanism 48 serving as a controlled object with the control shaft 60, and changing the lift characteristic of the valve, i.e., the lift characteristic of the intake valve of the engine E with the intake-side valve gear 50A is performed by the controller 90. Furthermore, as described above, since the intake-side and exhaust-side valve gears 50A and 50B have substantially the same structure, the hardware of the control system for the intake side is substantially the same as that for the exhaust side. Hereinbelow, the control for the intake side will be described.

Figure 10:
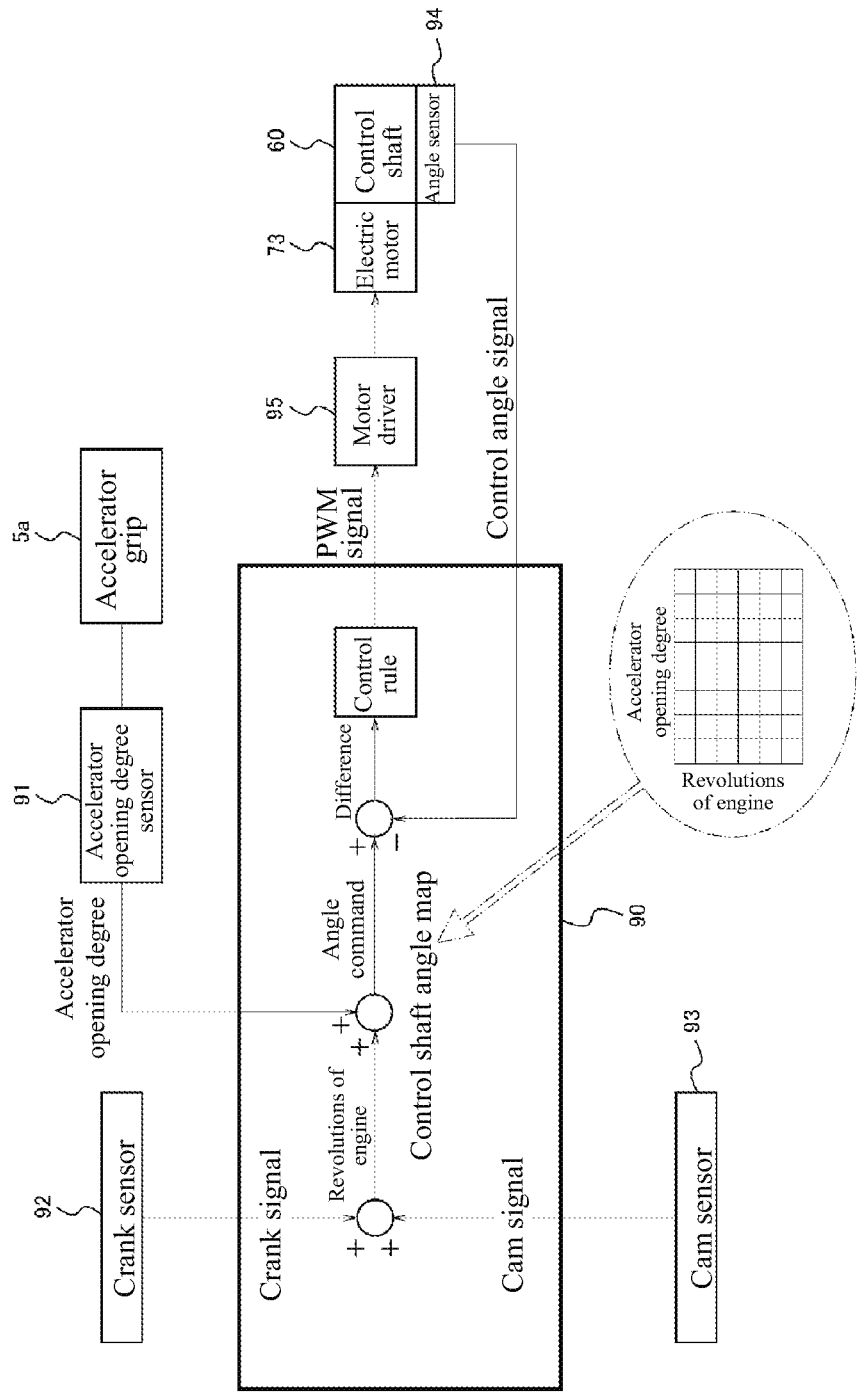
FIG. 10 is a block diagram of a drive control system of the control shaft.

An accelerator opening sensor 91 which detects a manipulation amount of an accelerator grip 5a of an electric motorcycle 1, a crank sensor 92 which outputs a pulse signal (crank signal) in response to rotation of a crankshaft 26 of the engine E, and a cam sensor 93 which similarly outputs a pulse signal (cam signal) in response to rotation of the driving cam shaft 24 are connected to the controller 90 as illustrated in FIG. 10. An angle sensor 94 which detects a pulse signal (control angle signal) in response to rotation of the control shaft 60 is also connected to the controller 90.

And in the normal control mode, the controller 90 calculates the number of rotations of the engine from the crank signal and the cam signal, and calculates an angle command corresponding to a target value of the angle of the control shaft 60 with reference to a control shaft angle map based on the number of rotations and a degree of an accelerator opening. For example, the control shaft angle map is a three-dimensional map in which an operation area of the engine E is divided into a plurality of areas according to the degree of the accelerator opening and the number of rotations of the engine, and a target value of the angle of the control shaft 60 for each area is set by experiments, etc. beforehand as illustrated in a lower position of the FIG. 10.

Based on a difference between the angle command (target value of the angle of the control shaft 60) read from the control shaft angle map and the angle of the control shaft 60 which can be calculated from the control angle signal, and, for example, in accordance with a predetermined control rule like a PID control, an output duty ratio to be output to the electric motor 73 is determined, and a PWM signal corresponding to the duty ratio is output to a motor driver circuit 95.

When the motor driver circuit 95 which has received the PWM signal supplies electric power to the electric motor 73, the electric motor 73 is driven by the electric power, thereby rotating the control shaft 60. In association with the rotating, as described above, the relative positional relationship between the pivot member 61 and the driven member 64 in the pivot cam mechanism 48 is changed, and the lift characteristic of the intake valve (valve body 53) of the engine E is changed. In this way, based on the accelerator manipulation by the rider R and the number of rotations of the engine, an intake charging efficiency of the engine E is controlled, and a suitable engine power control is performed.

When controlling the engine power according to the manipulation by the rider R, the control of the angle of the control shaft 60 is significantly important, and the controller 90 has the reference angle detection mode for detecting the angle (reference angle $\theta_0$) of the control shaft 60 which serves as a reference in the normal control mode. The stopper 80 is used to cause the arm 74d of the worm wheel 74 to come into contact with the contact portion 84a, and the angle detected by the angle sensor 94 at this time is used as the reference for the angle control of the control shaft 60.

That is, in the reference angle detection mode, the controller 90 drives the electric motor 73 so that the arm 74d of the worm wheel 74 is directed toward the contact portion 84a of the corresponding stopper 80 (i.e., rotated in the clockwise direction in FIG. 7) in a predetermined operation state such as an idling state of the engine E, and stores a rotation angle $\theta$, as the reference angle $\theta_0$, detected by the angle sensor 94 at a time point when a change rate $\omega$ of the rotation angle $\theta$ falls to a value less than a predetermined threshold $\omega 1$ from a value equal to or higher than the predetermined threshold $\omega 1$.

Figure 11:
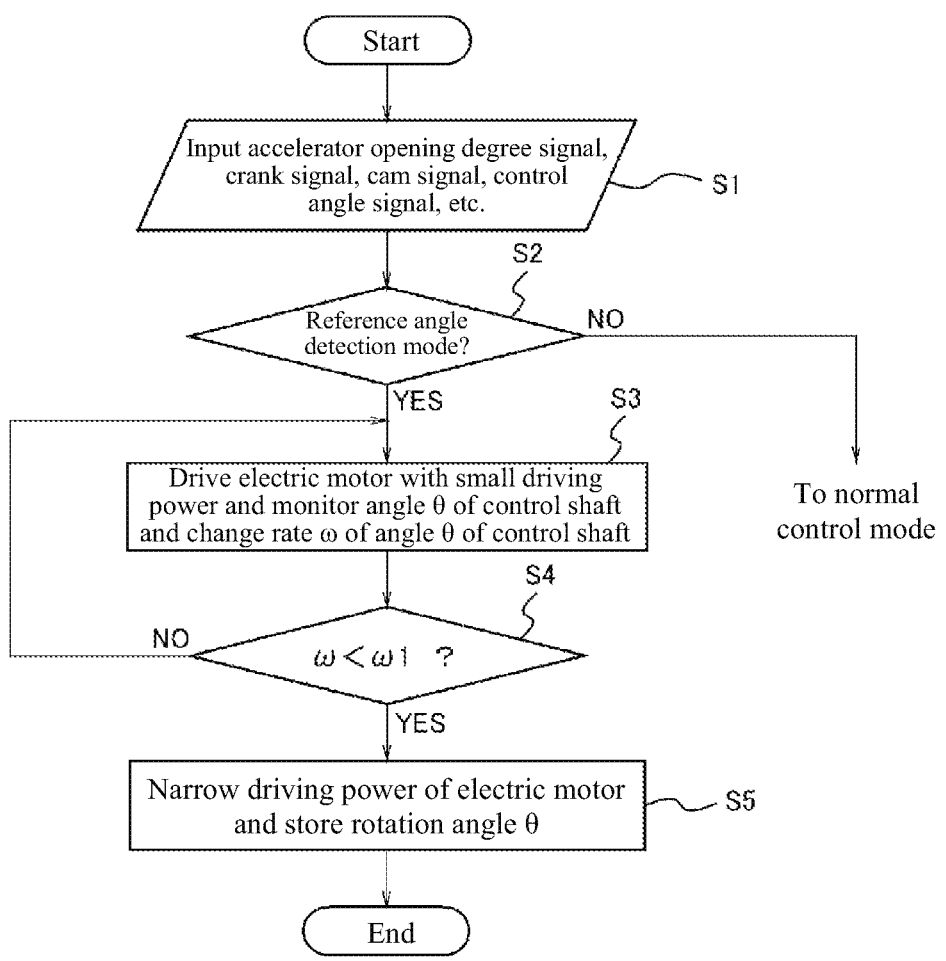
FIG. 11 is a flowchart diagram of control in a reference angle detection mode.

Hereinbelow, the procedure of the control in the reference angle detection mode is concretely described with reference to a flowchart diagram of FIG. 11. First, the controller 90 inputs at least the accelerator opening signal, the crank signal, the cam signal, and the control angle signal in Step S1 after a start, and determines whether it is in the reference angle detection mode in the subsequent Step S2.

For example, it is determined to be YES indicating the reference angle detection mode when the accelerator opening is approximately zero, revolutions of the engine calculated based on the crank signal and the cam signal is less than a predetermined value, and predetermined reference angle detection conditions are satisfied, and the procedure progresses to Step S3. On the other hand, when any one of the conditions is not satisfied (NO), although a detailed description is not given, the procedure progresses to the normal control mode based on the accelerator opening or the revolutions of the engine as described above.

In Step S3, the controller 90 drives the electric motor 73 in such a manner that the lift characteristic changes to a low lift, i.e., the arm 74d of the worm wheel 74 moves toward the contact portion 84a of the corresponding stopper 80, inputs the control angle signal with a predetermined sampling period during the drive, and monitors the rotation angle $\theta$ of the control shaft 60 and the change rate $\omega$ of the rotation angle $\theta$. Under the present circumstances, the duty ratio of the PWM signal is set to be relatively low, for example, so that the driving power of the electric motor 73 may be relatively small compared with the normal control mode.

Figure 12:
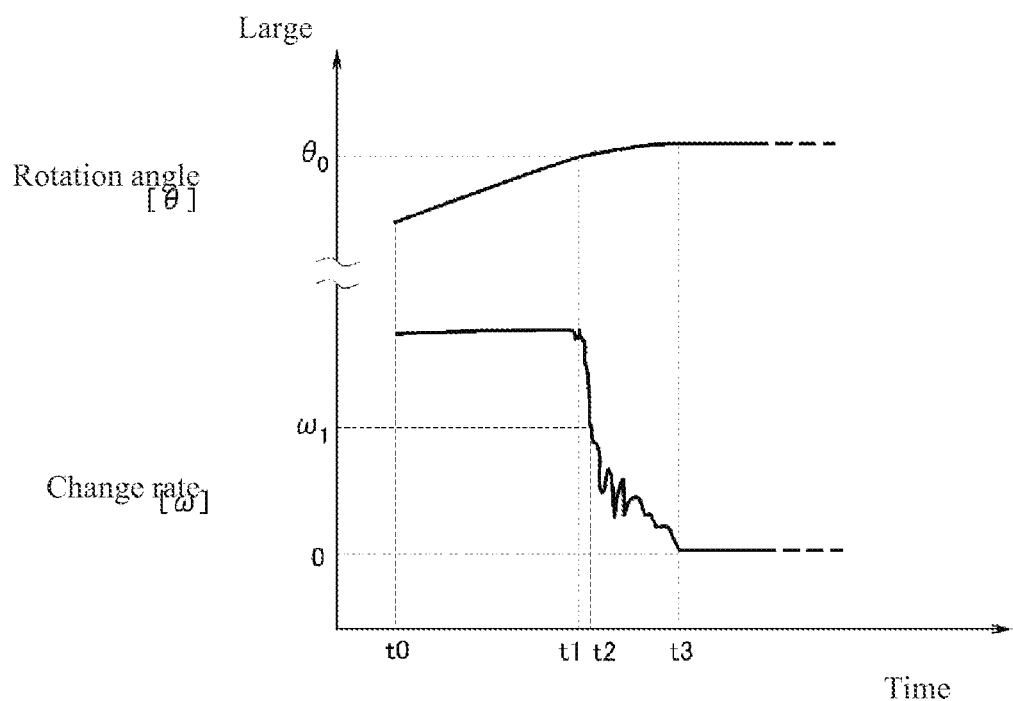
FIG. 12 is an imaginary view illustrating an angle, a change rate of the angle, and the like of the control shaft in the reference angle detection mode.

Thus, the rotation angle θ of the control shaft 60 and the change rate ω of the rotation angle θ that are monitored by the controller 90 change as illustrated in an imaginary view of FIG. 12, for example. That is, the rotation speed ω of the control shaft 60 is overall constant until the arm 74*d* of the worm wheel 74 comes into contact with the contact portion 84*a* of the torsion coil spring 84 of the stopper 80 (that is, within a period from time t0 to t1), and the rotation angle θ changes substantially over time but the biasing force of the torsion coil spring 84 which is restrained by the lower plate portion of the bent piece 83 until then is applied to the arm 74*d* at once when the arm 74*d* comes into contact with the contact portion 84*a* (at time t1).

Therefore, at the moment that the arm 74*d* comes into contact with the contact portion 84*a* as described above, the rotation speed of the worm wheel 74, i.e., the change rate ω of the rotation angle θ detected by the angle sensor 94 is notably lowered, and hence lowered to below a preset threshold ω1 (at time t2). Therefore, the controller 90 determines that the change rate ω of the rotation angle θ is less than the threshold ω1 (YES in Step S4), and narrows the driving power of the electric motor 73 to a predetermined minimum value and stores the rotation angle θ at this time point as the reference angle $θ_0$ (Step S5). Subsequently, the electric motor 73 performs a reverse rotation by a predetermined angle and then finishes (ends) the reference angle detection mode.

As described above, according to the present embodiment, a device which can correctly detect the reference angle of the control shaft 60 operating the pivot cam mechanism 48 serving as a variable mechanism is mounted in the intake-side valve gear 50A of the engine E, so that the control of the lift characteristic of the intake valve can be performed with high precision. That is, the engine power can be correctly controlled by the manipulation of the rider R as intended. In addition, even when the valve lift is small like an idling period, combustion stability (idling stability) of the engine E can be secured.

That is, in the reference angle detection mode, the electric motor 73 is driven with small power so that the arm 74*d* of the worm wheel 74, which is rotated together with the control shaft 60, is made to come into contact with the contact portion 84*a* of the stopper 80, and hence the change rate ω of the rotation angle θ of the control shaft 60 detected by the angle sensor 94 at this time is lowered. Accordingly, a state in which the control shaft 60 is in a position of the reference angle can be detected with high accuracy.

Furthermore, in the present embodiment, even though the torsion coil spring 84 is made to be pre-compressed in the stopper 80 and a spring constant is set to be not very high, the biasing force of the torsion coil spring 84 is loaded onto the arm 74*d* of the worm wheel 74 at once at the moment that the arm 74*d* of the worm wheel 74 comes into contact with the contact portion 84*a*, and the change rate ω of the rotation angle θ can be notably lowered. This also greatly contributes to improvement in the detection accuracy of the reference angle.

In addition, since the reference angle detection mode is performed in a state in which oil circulates through each portion of the valve gear 50A while the engine E is operating, and a mechanical frictional resistance is small, the rotation state of the control shaft 60 is stabilized and the detection of the reference angle can be stably performed.

Furthermore, even though the electric motor 73 operates at overspeed due to failure of the control system or the like during the normal operation mode and the arm 74*d* of the worm wheel 74 collides with the contact portion 84*a* of the stopper 80, this shock is absorbed by elastic deformation of the torsion coil spring 84. Accordingly, engagement between the spiral thread and the helical teeth in the worm gear mechanism 72 is loosened and a malfunction in the drive mechanism of the control shaft 60 can be prevented.

In the stopper 80 of the present embodiment, since the torsion coil spring 84 is pre-compressed as described above, the spring constant needs not be too much high, and it is easy to absorb the shock which occurs when the arm 74*d* of the worm wheel 74 collides with the contact portion 84*a* of the stopper 80. Therefore, the stopper is far more advantageous in terms of loosening the engagement in the worm gear mechanism 72.

In addition, in regard to the stopper 80, since the position of the contact portion 84*a* which determines the reference angle of the control shaft 60 can be adjusted, for example, when adjusting the lift variation of the four pivot cam mechanisms 48 using the jig 140 illustrated in FIG. 4, the contact portion 84*a* of the stopper 80 may be configured to come into contact with the arm 74*d* of the worm wheel 74. This setting is advantageous in terms of improving controllability because the reference angle in the angle control of the control shaft 60 is accurately matched with an angle at the time when the pivot member 61 and the driven member 64 in the pivot cam mechanism 48 are in a predetermined relative positional relationship.

—Other Embodiments—

Description of the above embodiment is only for the purpose of illustration and not for the purpose of restricting applications and uses thereof. In regard to the valve gear according to the present invention, alterations, additions, or deletions may be made to the configuration of embodiments without departing from the spirit of the present invention.

For example, although the torsion coil spring 84 is used as the spring member of the stopper 80 in the present embodiment, but the spring member is not limited thereto. A compression coil spring or a helical extension coil spring may be used. For example, a stopper 180 illustrated in FIG. 13 is structured in such a manner that an L-shaped bracket 181 is fixed to the cam cap 133 in a screwed manner, and a compression coil spring 182 hangs down from a floor portion. Disc-like washers 183 and 184 having a central hole are disposed in an upper end and a lower end of the compression coil spring 182, respectively, and a contact portion 184*a* which comes into contact with an arm 74*d* of a worm wheel 74 is provided in a lower surface of the washer 184 in a manner of bulging downward from a position on the periphery of the washer.

A nut 185 which is arranged to be concentric to the central hole is welded to the lower surface of the lower washer 184. The shank of a central bolt 186 which supports the lower washer 184 is screwed into the nut 185. The shank of the central bolt 186 is inserted through a screw hole of the floor portion of the L-shaped bracket 181. By turning the central bolt 186 while holding the head disposed in an upper end of the central bolt 186, the lower washer 184 can be displaced in the vertical direction. In this way, the position of the contact portion 184*a* which comes into contact with the arm 74*d* of the worm wheel 74 is adjusted.

On the other hand, lower ends of three adjustment bolts 187 which pass through the floor portion of the L-shaped bracket 181 from above come into contact with positions on the outer periphery of an upper surface of the upper washer 183 which comes into contact with an upper end of the compression coil spring 182. The upper washer 183 is displaced in the vertical direction by turning the adjustment bolts 187. With this configuration, it is possible to adjust the amount of pre-compression of the compression coil spring 182 which is compressed between the upper and lower washers 183 and 184.

In addition, in the embodiments illustrated in FIGS. 7 and 13, the worm wheel 74 is rotated in the clockwise direction in each figure so that the arm 74d is made to come into contact with the stopper 80 or 180, thereby detecting the reference angle, but the present invention is not limited thereto. The reference angle may be detected when the worm wheel 74 is rotated in the counterclockwise direction in each figure and the arm 74d comes into contact with the stopper 80 or 180. In this case, the spring member, the restricting portion, etc. may be provided in a contact position between the arm 74d and the stopper 80 or 180.

For example, according to the present embodiment, each of the intake-side and exhaust-side valve gears 50A and 50B of the engine E includes the pivot cam mechanism 48 which can change lift characteristics, but, for example, only the intake-side valve gear 50A may include the variable mechanism. Furthermore, the exhaust-side valve gear 50B may be configured to enable a change in the phase of the valve.

Yet furthermore, in the present embodiment, the reference angle detecting device is applied, but not limitedly, to the angle control of the control shaft 60 connected to the pivot cam mechanism 48 of the valve gears 50A and 50B of the engine E. Aside from this, for example, it is applicable to the motion control etc. of a pulley of CVT which transmits the output of the engine E to a wheel.

INDUSTRIAL APPLICABILITY

As described above, the reference angle detecting device according to the present invention has an effect of detecting a reference angle for control with high accuracy while preventing generation of a malfunction attributable to engagement of a worm gear mechanism which drives a control shaft, and is advantageous because it is widely applied to, for example, the variable mechanism of the valve operating system of an engine.

REFERENCE CHARACTERS LIST

E: Engine
48: Pivot cam mechanism (controlled object)
50A, 50B: Valve gear (variable valve actuation mechanism)
51A: Intake valve mechanism
51B: Exhaust valve mechanism
53: Valve body (intake valve)
72: Worm gear mechanism
73: Electric motor
74: Worm wheel
75: Worm gear
80: Stopper
83: Bent piece (restricting portion)
84: Torsion coil spring (spring member)
84a: Contact portion
90: Controller
94: Angle sensor
180: Stopper
182: Compression coil spring (spring member)
184: Lower washer
184a: Contact portion
185: Nut (restricting portion)

The invention claimed is:

1. A reference angle detecting device comprising:
   a control shaft connected to a controlled object in order to control an angle of the controlled object;
   a worm wheel connected to the control shaft so as to cause the control shaft to rotate about an axial center thereof;
   a worm gear that meshes with the worm wheel;
   an electric motor for rotating the worm gear;
   a controller that controls the electric motor;
   a stopper disposed on a motion track of the worm wheel in order to restrict a rotatable range of the control shaft; and
   an angle sensor capable of detecting a rotation angle of the control shaft,
   wherein the stopper includes a spring member that is elastically deformable in an operation direction of the worm wheel, and
   the controller drives the electric motor to operate so that the worm wheel comes to face the stopper, and stores as a reference angle a rotation angle at a time point when a change rate of the rotation angle detected by the angle sensor during drive of the electric motor changes from a value equal to or higher than a predetermined threshold to a value less than the threshold.

2. The reference angle detecting device according to claim 1, wherein the stopper further includes a contact portion that comes into contact with the worm wheel and is movable in the operation direction, and a restricting portion that restricts movement of the contact portion to the worm wheel in a state in which the contact portion is biased toward the worm wheel by the spring member.

3. The reference angle detecting device according to claim 2, wherein the stopper further includes an adjusting mechanism that enables adjustment of a position where movement of the contact portion is restricted by the restricting portion.

4. The reference angle detecting device according to claim 1, wherein
   the controller has a normal control mode in which the electric motor is driven to operate in order to control the angle of the controlled object, and a reference angle detection mode in which the electric motor is driven to operate in order to detect the reference angle, and
   the controller controls the electric motor so that driving power of the electric motor in the reference angle detection mode is smaller than driving power of the electric motor in the normal control mode.

5. The reference angle detecting device according to claim 1, wherein
   the reference angle detecting device is used for a variable valve actuation mechanism of an engine, and
   the control shaft is a member configured to change a lift characteristic of an intake valve or an exhaust valve of the engine according to the rotation angle of the control shaft.

6. The reference angle detecting device according to claim 5, wherein the controller drives the electric motor to operate in order to detect the reference angle in a state in which the engine is operating.

* * * * *